US012653734B2

(12) United States Patent

Pozzi et al.

(10) Patent No.: US 12,653,734 B2
(45) Date of Patent: Jun. 16, 2026

(54) SYSTEMS, METHODS, AND DEVICES FOR WHEELCHAIR RESTRAINT

(71) Applicant: Supernal, LLC, Washington, DC (US)

(72) Inventors: Alexander Pozzi, Carlsbad, CA (US); Benjamin David Stephens, Winston-Salem, NC (US)

(73) Assignee: Supernal, LLC, Irvine, CA (US)

( * ) Notice: Subject to any disclaimer, the term of this patent is extended or adjusted under 35 U.S.C. 154(b) by 370 days.

(21) Appl. No.: 18/350,553

(22) Filed: Jul. 11, 2023

(65) Prior Publication Data

US 2024/0016673 A1 Jan. 18, 2024

Related U.S. Application Data

(60) Provisional application No. 63/368,574, filed on Jul. 15, 2022.

(51) Int. Cl.
*A61G 3/00* (2006.01)
*A61G 3/08* (2006.01)

(52) U.S. Cl.
CPC .................................. *A61G 3/0808* (2013.01)

(58) Field of Classification Search
CPC ................................ A61G 3/08; A61G 3/0808
USPC .............................................................. 410/7
See application file for complete search history.

(56) References Cited

U.S. PATENT DOCUMENTS

| | | | | |
|---|---|---|---|---|
| 7,040,847 | B1 * | 5/2006 | Cardona | B60P 3/079 410/12 |
| 10,130,529 | B2 * | 11/2018 | Gale | A61G 3/0808 |
| 10,953,987 | B2 * | 3/2021 | Johnson | B64D 11/0691 |
| 12,162,426 | B2 * | 12/2024 | Jaradi | A61G 3/0808 |
| 2021/0001800 | A1 * | 1/2021 | Sekizuka | B60R 22/3416 |
| 2021/0221275 | A1 * | 7/2021 | Fang | B60P 7/0846 |

OTHER PUBLICATIONS

Sampson, H., Delta unveils first wheelchair-friendly seat, The Washington Post, Jun. 6, 2023, https://www.washingtonpost.com/travel/2023/06/06/delta-wheelchair-seat/.

* cited by examiner

*Primary Examiner* — Steven O Douglas
(74) *Attorney, Agent, or Firm* — Bookoff McAndrews, PLLC

(57) ABSTRACT

A wheelchair anchor system for a vehicle, the wheelchair anchor system comprising a support surface configured to support a portion of a wheelchair; a floor mount configured to secure a portion of the wheelchair to a surface of the vehicle; an attachment mechanism for securing a portion of the wheelchair to the floor mount; and a harness configured to secure an occupant of the wheelchair.

19 Claims, 6 Drawing Sheets

SYSTEMS, METHODS, AND DEVICES FOR WHEELCHAIR RESTRAINT

CROSS-REFERENCE TO RELATED APPLICATIONS

This application claims priority to U.S. Provisional Application No. 63/368,574, filed Jul. 15, 2022, which is incorporated by reference herein in its entirety.

TECHNICAL FIELD

The present disclosure relates to systems, methods, and devices for a wheelchair restraint, and more specifically to a wheelchair restraint on a vehicle.

BACKGROUND

People that use wheelchairs may encounter difficulties when traveling, including traveling via public transportation of any kind. For example, many vehicles require use of a built-in seat, and wheelchair users must generally transfer from a wheelchair to the built-in seat to ride in the vehicle. This transfer of persons from a wheelchair to another seat may be difficult, time-consuming, and potentially hazardous. Additionally, wheelchair users must trust that their wheelchairs will be properly cared for by those handling cargo for the vehicle.

Some vehicles may include systems that are capable of accommodating a wheelchair, but such vehicles and/or systems may be difficult for users, e.g., wheelchair passengers, to utilize, may require significant time for ingress and egress of the wheelchair, may have limited space for maneuvering of the wheelchair, and may be unable to handle certain types of wheelchairs.

SUMMARY OF THE DISCLOSURE

The present disclosure is directed to a wheelchair anchor system for a vehicle, the wheelchair anchor system comprising a support surface configured to support a portion of a wheelchair; a floor mount configured to secure a portion of the wheelchair to a surface of the vehicle; an attachment mechanism for securing a portion of the wheelchair to the floor mount; and a harness configured to secure an occupant of the wheelchair.

Various embodiments of the wheelchair anchor system may include one or more of the following features. The support surface may extend laterally from a surface of the vehicle. In a first position, the support surface may extend laterally from the surface of the vehicle, and in a second position, the support surface may be received in a recess of the surface of the vehicle. A plurality of floor mounts and a plurality of attachment mechanisms. The harness may extend from a surface of the vehicle to the floor mount. An upper harness mount may be attached to the surface of the vehicle and a lower harness mount may be attached to the floor mount. The support surface may be configured to slide underneath a seat portion of the wheelchair. A height of the support surface may be adjustable. The support surface may be a non-wheelchair seat. A suspension device for attaching a portion of the wheelchair to a surface of the vehicle, wherein the suspension device may be configured to absorb forces during vehicle motion. The vehicle may be an aircraft.

The present disclosure is also directed to a wheelchair anchor system for a vehicle, the wheelchair anchor system comprising a non-wheelchair seat, wherein a portion of the non-wheelchair seat is configured to fold into a recess of a first vehicle surface; a floor mount configured to secure a wheelchair to a second vehicle surface; and a harness configured to secure an occupant of the wheelchair.

Various embodiments of the wheelchair anchor system may include one or more of the following features. The first vehicle surface may be a vertical wall of the vehicle. The second vehicle surface may be a floor surface. The harness may be coupled at a first end to the first vehicle surface and at a second end to the second vehicle surface. The wheelchair anchor system may include at least two floor mounts.

The present disclosure is also directed to a method of securing a wheelchair to a vehicle, the method comprising: stowing a non-wheelchair seat in a vehicle; placing a wheelchair in the vehicle, such that the wheelchair abuts a portion of the non-wheelchair seat; and anchoring the wheelchair to a floor of the vehicle.

Various embodiments of the method of securing a wheelchair to a vehicle may include one or more of the following features. Stowing the non-wheelchair seat may comprise folding the non-wheelchair seat towards a vertical surface of the vehicle. Anchoring the wheelchair to the floor may comprise anchoring at least one wheel of the wheelchair to a floor mount of the vehicle. Securing a passenger in the wheelchair with a harness.

BRIEF DESCRIPTION OF THE DRAWINGS

The accompanying drawings, which are incorporated in and constitute a part of this specification, illustrate various examples and, together with the description, serve to explain the principles of the disclosed examples and embodiments.

Aspects of the disclosure may be implemented in connection with embodiments illustrated in the attached drawings. These drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments described and illustrated herein. The present disclosure is neither limited to any single aspect or embodiment thereof, nor is it limited to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1A:
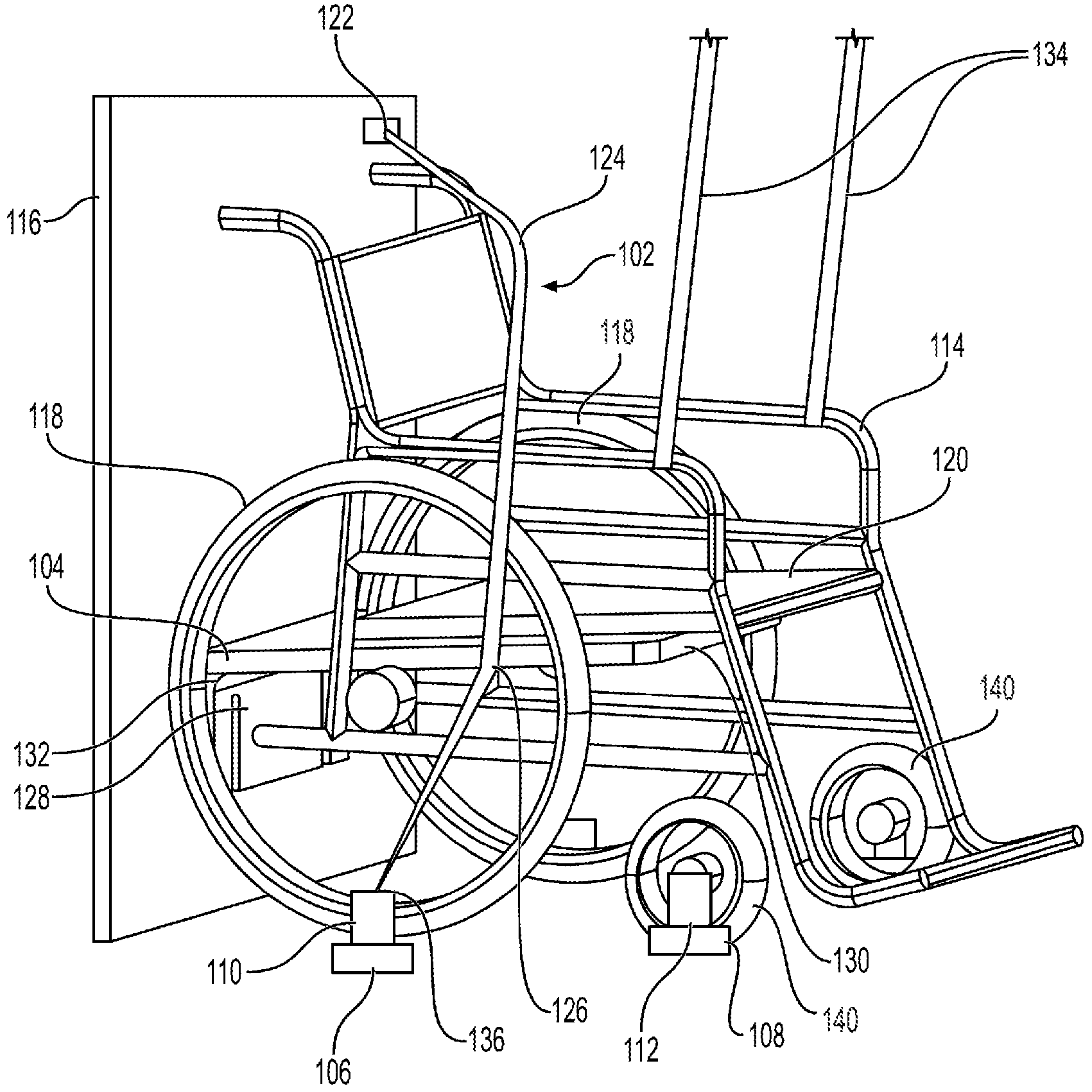

FIG. 1A is a perspective view of a wheelchair anchor system, according to embodiments of the present disclosure.

Figure 1B:
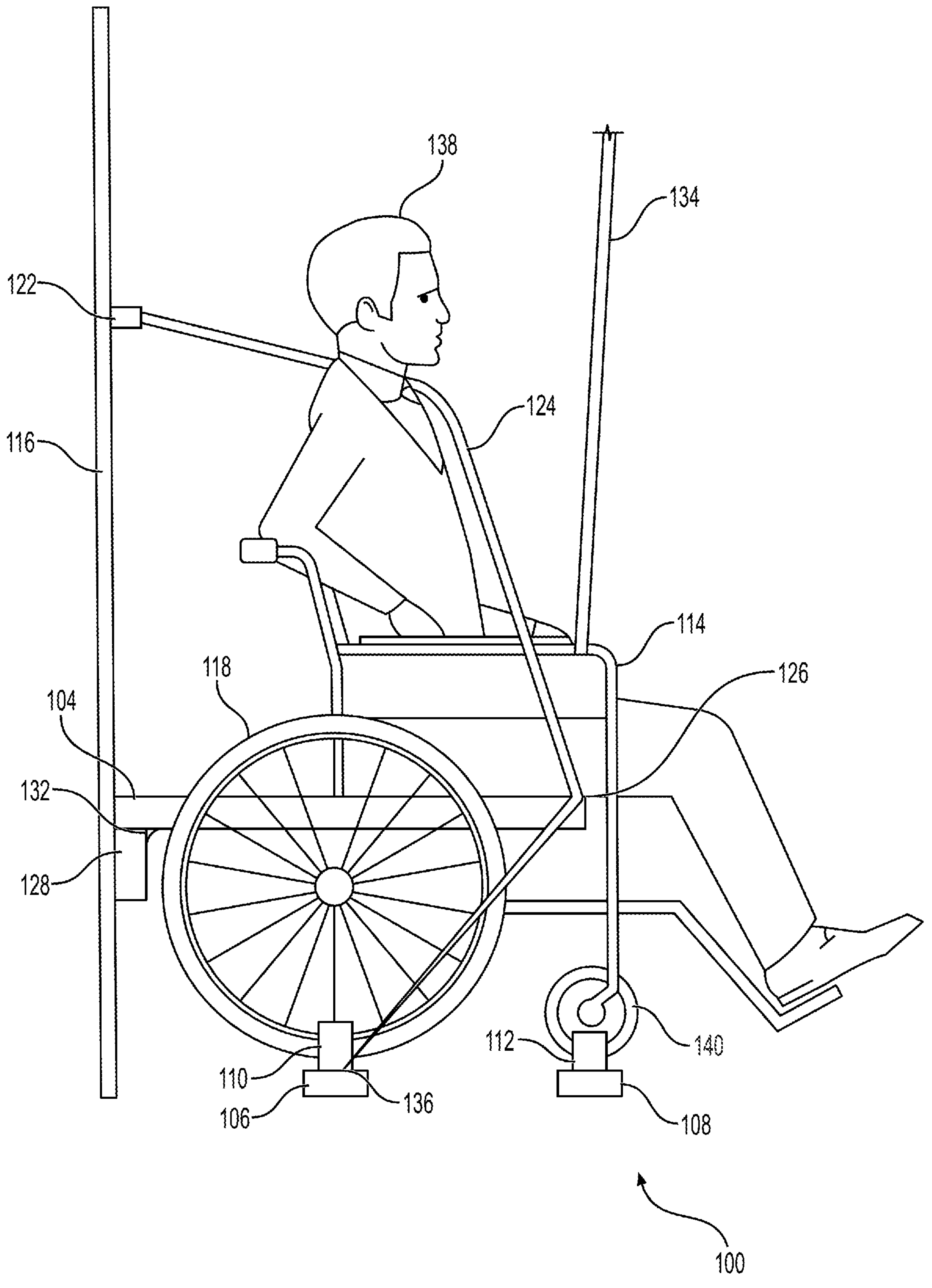

FIG. 1B is a side view of wheelchair anchor system, according to embodiments of the present disclosure.

Figure 2:
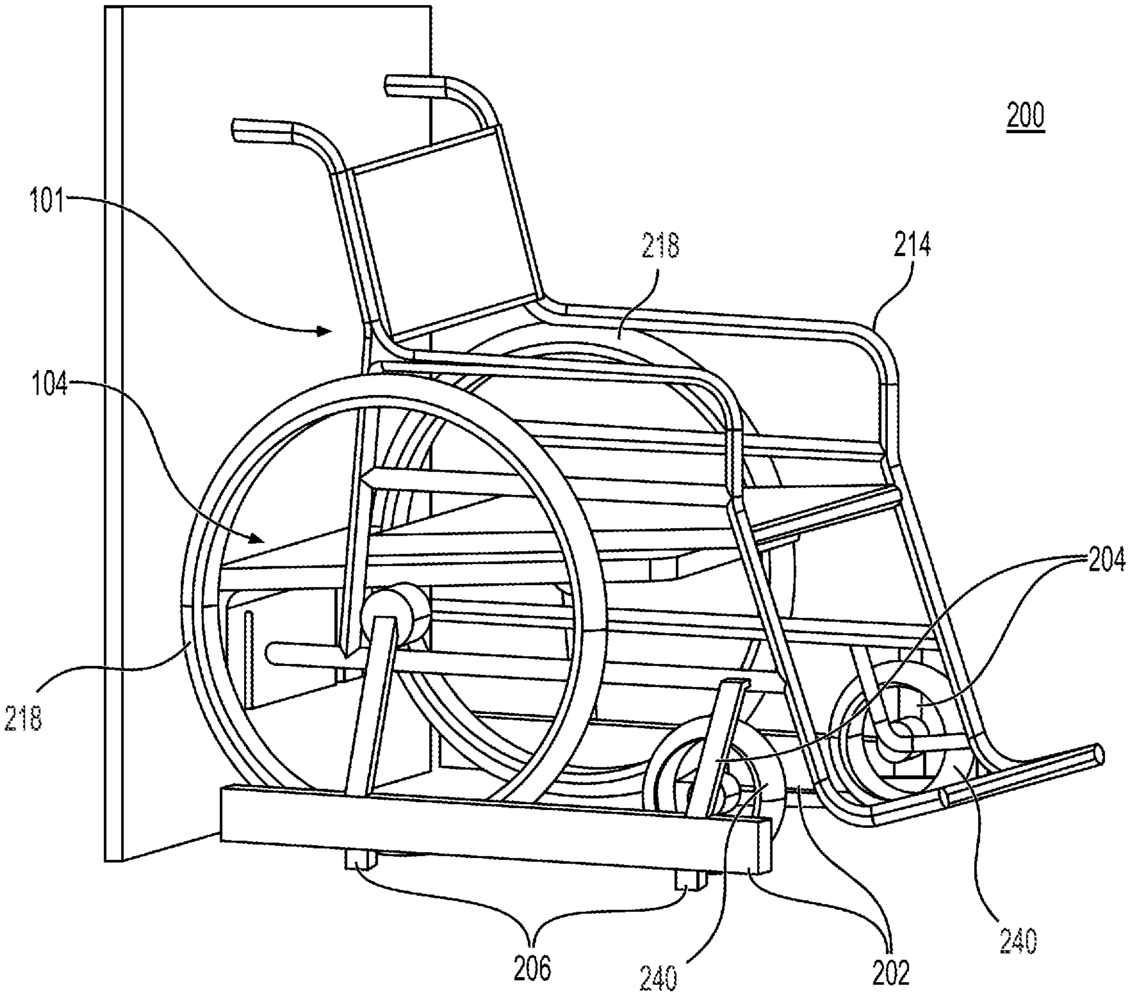

FIG. 2 is a perspective view of a wheelchair anchor system, according to embodiments of the present disclosure.

Figure 3:
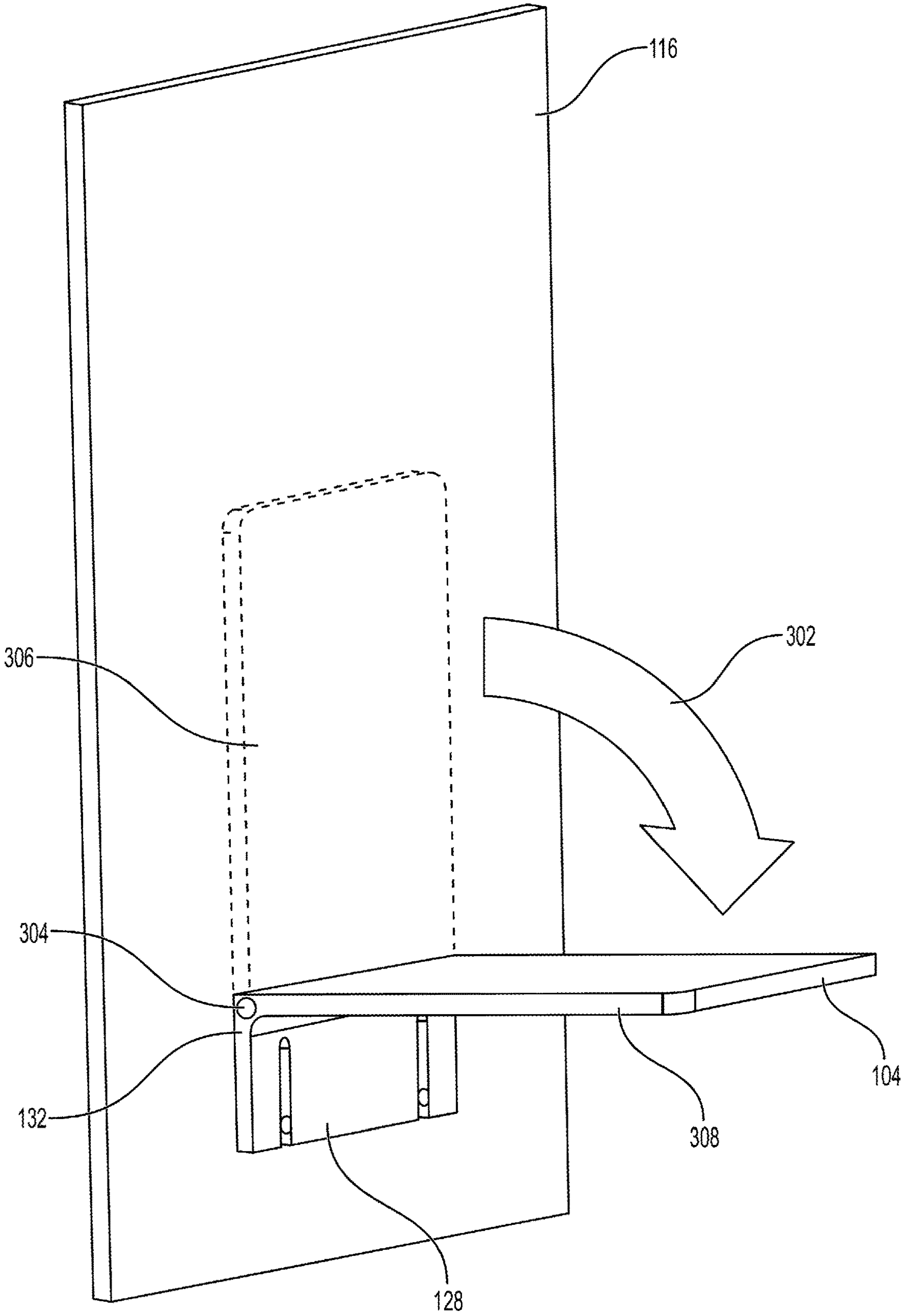

FIG. 3 is a perspective view of support service, according to embodiments of the present disclosure.

Figure 4:
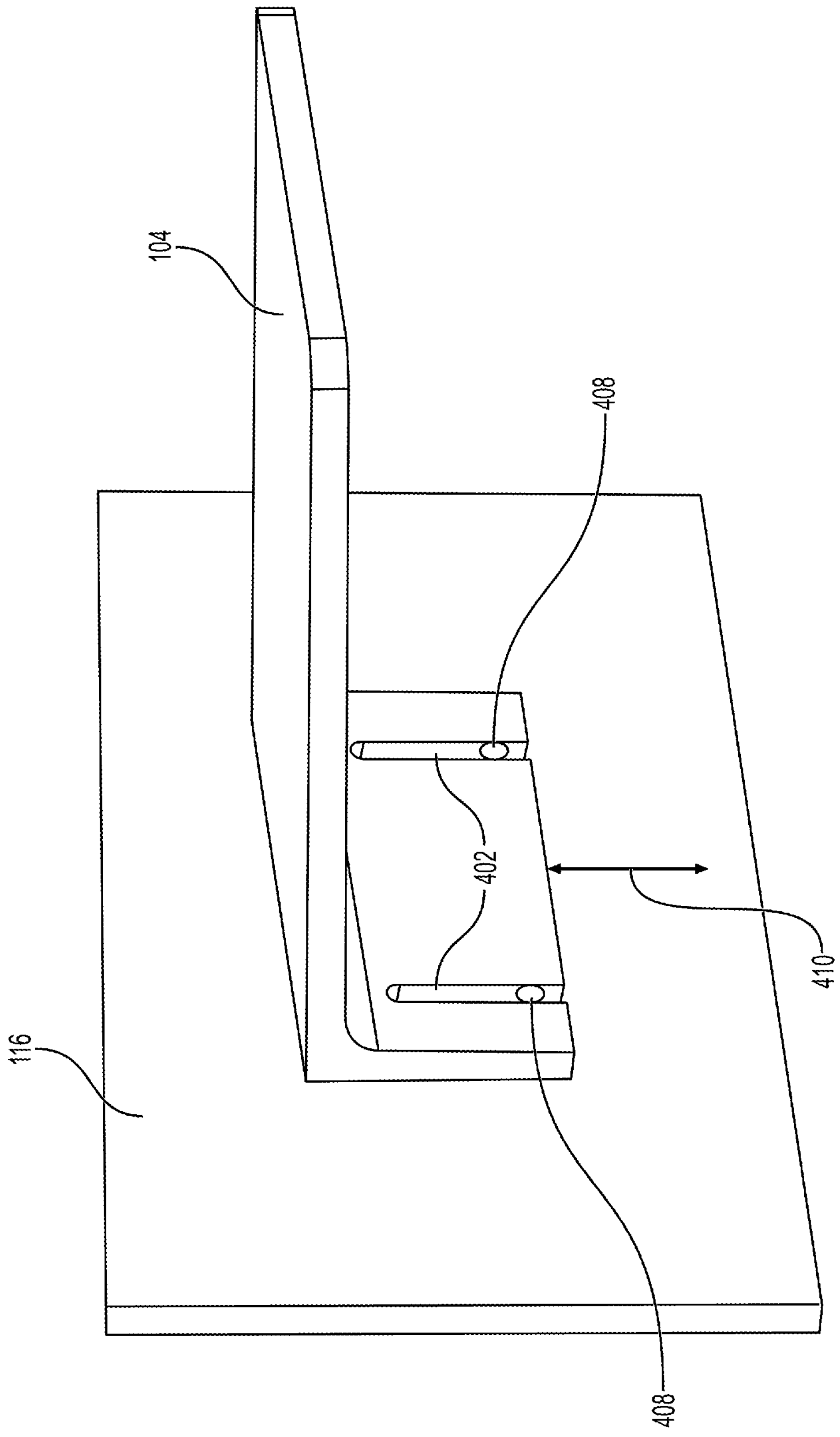

FIG. 4 is a perspective view of a support surface, according to embodiments of the present disclosure.

Figure 5:
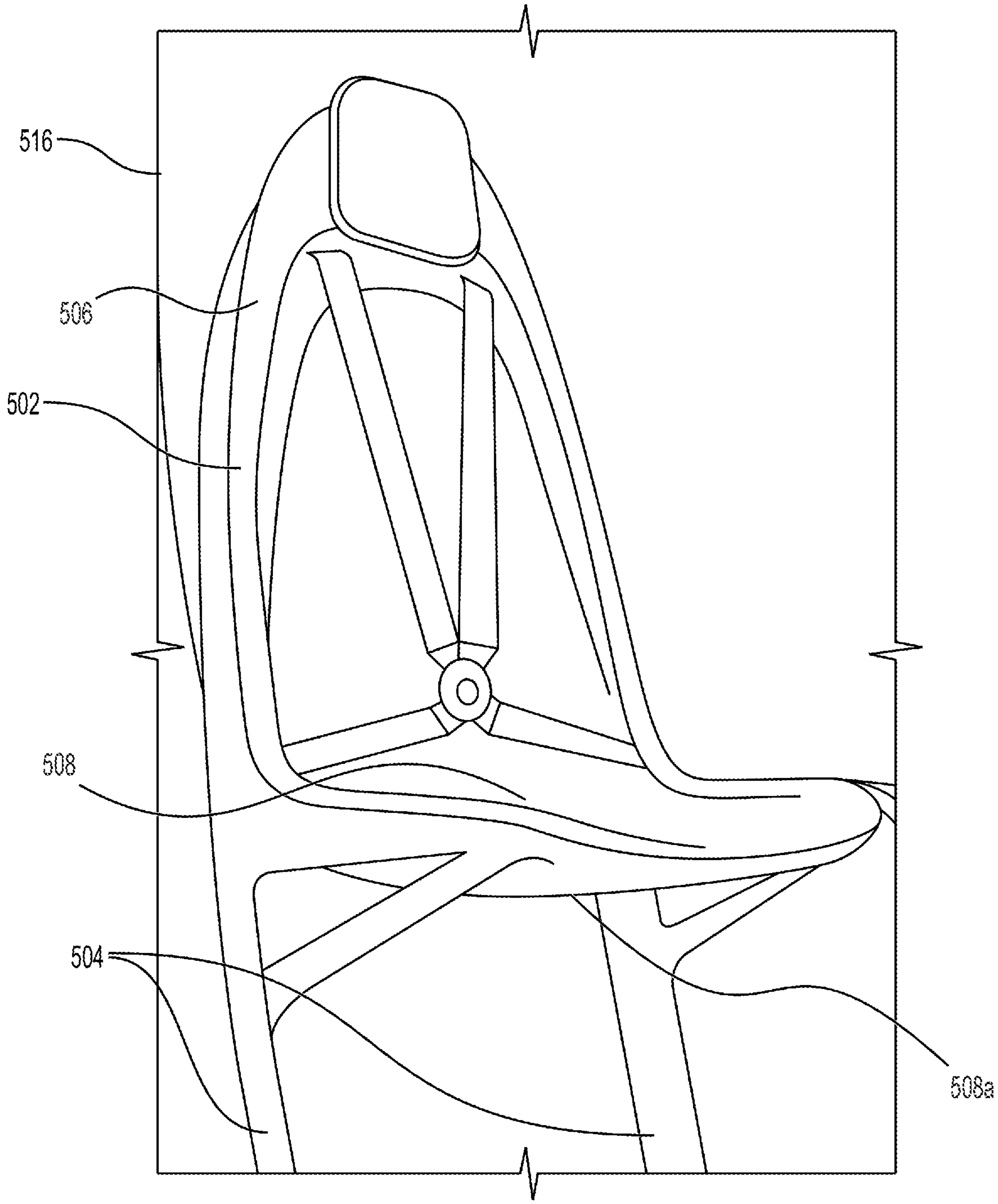

FIG. 5 is a perspective view of a non-wheelchair seat in a vehicle, according to embodiments of the present disclosure.

As used herein, the terms "comprises," "comprising," "includes," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." In addition, the terms "first," "second," and the like, herein do not denote any order, quantity, or importance, but rather are used to distinguish an element or a structure from another. Moreover, the terms "a" and "an" herein do not denote a limitation of quantity, but rather denote the presence of one or more of the referenced items.

Notably, for simplicity and clarity of illustration, certain aspects of the figures depict the general structure and/or manner of construction of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments. For example, one of ordinary skill in the art appreciates that the side views are not drawn to scale and should not be viewed as representing proportional relationships between different components. The side views are provided to help illustrate the various components of the depicted assembly, and to show their relative positioning to one another.

DETAILED DESCRIPTION OF INVENTION

Reference will now be made in detail to examples of the present disclosure, which are illustrated in the accompanying drawings. Wherever possible, the same reference numbers will be used throughout the drawings to refer to the same or like parts. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

It may be desirable to develop systems, devices, and methods for a wheelchair anchor system and/or wheelchair structure that may allow for a wheelchair user to more easily travel in vehicles. For example, wheelchair anchor systems and/or wheelchair structures as will be disclosed herein may allow for additional wheelchair loads, reduce time for ingress and egress of the wheelchair from a vehicle, and reduce a space used to anchor a wheelchair in the vehicle. Such a wheelchair anchor system or wheelchair structure is also desirable because it provides the ability for an individual to remain in their own wheelchair, without requiring the individual to transfer from one chair to another in order to be seated safely in a vehicle. Furthermore, in some embodiments, a vehicle may be configured to allow for installation of a non-wheelchair seat to which a wheelchair may be secured in a manner that counteracts vehicle loads during operation of the vehicle (including, for example, bumps, turbulence, collision, and/or crash).

The present disclosure may be implemented, incorporated in, or utilized in conjunction with any type of vehicle, such as a flying vehicle (e.g., aircraft, vertical take-off and landing (VTOL) vehicle, airliner), a motor vehicle (e.g., motorcycles, cars, trucks, buses), a railed vehicle (e.g., trains, trams), or watercraft (e.g., taxis, hydrofoils, cruise-liners). Those of ordinary skill in the art will readily recognize that the listing of vehicles above is exemplary and that the concepts of the present disclosure may be used in conjunction with any suitable or comparable vehicle.

FIG. 1A is a perspective view of a wheelchair anchor system 100, according to the present disclosure. FIG. 1B is a side view of wheelchair anchor system 100, according to the present disclosure. Wheelchair anchor system 100 may be used to anchor a wheelchair 114 to one or more surfaces 116. For example, the wheelchair anchor system 100 may be used to anchor a wheelchair 114 to surface 116 of a vehicle.

Surface 116 may be a wall (e.g., a bulkhead) that extends from a floor to a ceiling of a vehicle. In some embodiments, surface 116 may extend up from the floor of a vehicle without reaching the ceiling, or may extend down from the ceiling without reaching the floor. Surface 116 may also extend from a side of an interior of the vehicle. In some examples, surface 116 may be a load-bearing support structure for the vehicle, which may increase the structural rigidity and strength of the vehicle. Surface 116 may be used to divide or partition an interior of the vehicle into different areas, such as areas for different classes of service or to separate a cargo storage area from a passenger seating area. Surface 116 may be configured to have a substantially vertical orientation. In some embodiments, surface 116 may be designed at an angle. In other embodiments, surface 116 may be curved. In some embodiments, surface 116 may be a rear-end wall or a side wall for a vehicle (e.g., a wall of a fuselage of an aircraft or a hull of a ship). Such vehicles that include wheelchair anchor systems according to the present disclosure may be designed such that one or more non-wheelchair seats may fold up, allowing space for a wheelchair to fit into the prior non-wheelchair seat area. In such embodiments, surface 116 may be one or more surfaces of the non-wheelchair seat once they are folded up and secured in place.

Wheelchair anchor system 100 may include a harness 102, a support surface 104, floor mounts 106, 108, and attachment mechanisms 110, 112.

Support surface 104 may be integrated into, fastened to, applied to, formed with, and/or attached to surface 116 and may extend away from surface 116 in a generally horizontal (e.g., lateral) direction. In some embodiments, and as will be further described below, support surface 104 may slide underneath a portion of wheelchair 114, e.g., a seat portion of wheelchair 114. For example, support surface 104 may be attached to surface 116 at connector segment 128. Connector segment 128 may be fastened, welded, and/or otherwise generally attached, to surface 116. Connector segment 128 may also be fastened, welded, and/or otherwise generally attached to support surface 104 such that support surface 104 may be integrally attached to surface 116. By being integrally attached to surface 116, support surface 104 may support significant amounts of downward force (e.g., more than 300 pounds), even at an end portion 130 of support surface 104.

Support surface 104 may further include a flange 132 that extends between support surface 104 and connector segment 128 that may transfer a portion of the load from support surface 104 to surface 116. As shown in FIGS. 1A and 1B, support surface 104 may be capable of supporting a seat (e.g., a seating surface 120 of wheelchair 114) and the seat occupant (e.g., occupant 138 of FIG. 1B). For example, a portion of seating surface 120 of wheelchair 114 may rest directly on support surface 104.

In some embodiments, support surface 104 may absorb shocks and/or dampen vibrations caused by motion of the vehicle. Support surface 104 may be flexible to allow for elastic displacement without support surface 104 experiencing plastic deformation. Support surface 104 may be designed to experience plastic deformation and collapse in a controlled manner during an impact event (e.g., large amounts of force during a crash of the vehicle, or during a hard landing or turbulence of an aircraft) such that energy from the force is absorbed and dissipated by support surface 104 and/or transferred to a vehicle structure, such as surface 116. The absorption of energy during plastic deformation may prevent harm to occupant 138 and/or damage to wheelchair 114.

In some embodiments, support surface 104 may include a removably attached padding (e.g., a cushion) such that an individual may sit directly on support surface 104. In such embodiments, support surface 104 may function as a non-wheelchair vehicle seat or a part of a non-wheelchair vehicle seat.

Support surface 104 may have any appropriate size such that a conventional wheelchair may be supported by and/or anchored to support surface 104. In some embodiments, support surface 104 may have a width ranging from about 10 inches to about 20 inches. For example, a width of support surface 104 may range from about 10 inches to about 18 inches, about 10 inches to about 16 inches, about 10 inches to about 14 inches, about 12 inches to about 20 inches, about 12 inches to about 18 inches, about 12 inches to about 16 inches, or about 12 inches to about 14 inches. Support surface 104 may have a thickness ranging from about 0.25 inch to about 3.00 inches. For example, a thickness of support surface 104 may range from about 0.25 inch to about 2.75 inches, about 0.25 inch to about 2.50 inches, about 0.25 inch to about 2.00 inches, about 0.25 inch to about 1.75 inches, about 0.25 inch to about 1.50 inches, about 0.25 inch to about 1.25 inches, about 0.50 inch to about 3.00 inches, about 0.50 inch to about 2.75 inches, about 0.50 inch to about 2.50 inches, about 0.50 inch to about 2.25 inches, about 0.50 inch to about 2 inches, about 0.50 inch to about 1.75 inches, about 0.50 inch to about 1.50 inches, about 0.50 inch to about 1.25 inches, about 0.75 inch to about 3.00 inches, about 0.75 inch to about 2.75 inches, about 0.75 inch to about 2.50 inches, about 0.75 inch to about 2.25 inches, about 0.75 inch to about 2.00 inches, about 0.75 inch to about 1.75 inches, about 0.75 inch to about 1.50 inches, or about 0.75 inch to about 1.25 inches.

In some embodiments, support surface 104 may have a height ranging from about 8 inches to about 24 inches above the floor of the vehicle when support surface 104 is not supporting any weight. This height may be measured from a top surface of support surface 104 and may be referred to as a first height. For example, support surface 104 may have a first height ranging from about 8 inches to about 22 inches, about 8 inches to about 20 inches, about 8 inches to about 18 inches, about 8 inches to about 16 inches, about 8 inches to about 14 inches, about 8 inches to about 12 inches. When a wheelchair 114 is anchored, and seating surface 120 is supported by support surface 104, support surface 104 may flex and an end of support surface 104 furthest from surface 116 may stroke downward by about four to about six inches. Thus, when support surface 104 is helping to support some of the weight of occupant 138, the end of support surface 104 furthest from surface 116 may have a height from the floor ranging from about 4 inches to about 20 inches. This height may be measured from a top surface of support surface 104 and may be referred to as a second height. For example, support surface 104 may have a second height ranging from about 4 inches to about 18 inches, about 4 inches to about 16 inches, about 4 inches to about 14 inches, about 4 inches to about 12 inches, or about 4 inches to about 10 inches. Support surface 104 may include an energy-absorbing (e.g., crushable) pad upon which seating surface 120 rests. The energy-absorbing pad may be formed from EnsoLite® foam, low-density polyethylene foam (e.g., LD24), or Ethafoam®.

Wheelchair anchor system 100 may include a suspension device 134 that may be used to further support wheelchair 114 and/or occupant 138. Suspension device 134 may absorb shock, loads, and/or other forces, e.g., during vehicle motion and/or in the event of a crash and/or turbulence. Suspension device 134 may attach a portion of wheelchair 114, e.g., one or both of the armrests, a portion of the wheelchair frame, a portion of wheel 118, or combinations thereof, to a portion of a ceiling or other appropriate surface of the vehicle. To attach a portion of wheelchair 114 to a surface of the vehicle, suspension device 134 may be looped around any solid structurally supporting component of wheelchair 114, including, e.g., one or both of the armrests, a portion of the wheelchair frame, a portion of wheel 118, or combinations thereof. Suspension device 134 may be an elastic spring or any other appropriate device to absorb shock, load, and/or other forces during vehicle motion.

Wheelchair anchor system 100 may include at least one floor mount 106, 108 to secure and/or anchor wheelchair 114 to a portion of the vehicle, e.g., a floor surface of the vehicle. Floor mounts 106, 108 may be fastened to the floor surface via any type of fastener including, e.g., screws, bolts, nails, or any other appropriate type of fastener. In some embodiments, floor mounts 106, 108 may be permanently fastened to the floor, e.g., via welding. In other examples, floor mounts 106, 108 may be an integral part of the floor surface, e.g., floor mounts 106, 108 may have been designed and/or configured as a part of the floor surface during manufacturing of the vehicle. Floor mounts 106, 108 may be any appropriate size to receive a wheel (e.g., wheel 118 or wheel 140) of wheelchair 114.

Floor mounts 106, 108 may be used in conjunction with one or more attachment mechanisms 110, 112. For example, attachment mechanisms 110, 112 may be attached to floor mounts 106, 108. Attachment mechanism 110, 112 may be attached to floor mounts 106, 108 by screws, bolts, fasteners, or any other appropriate means. In other examples, attachment mechanism 110, 112 may be attached to floor mounts 106, 108 via a snap-fit or friction-fit. For example, attachment mechanisms 110, 112 may be snapped to a portion and/or received by a portion of floor mounts 106, 108. Attachment mechanisms 110, 112 may be attached to floor mounts 106, 108 via a pinned connection. In some embodiments, several additional floor mounts may be included at different locations such that attachment mechanisms 110, 112 may be secured at different locations to accommodate different types of wheelchairs. Additionally, wheelchair anchor system 100 may include different kinds of attachment mechanisms 110, 112 that may be attached to different kind of wheels for different kinds of wheelchairs. For example, an electronic wheelchair may include smaller back wheels as compared to a manual wheelchair, such as wheelchair 114 shown in FIG. 1A. In other embodiments, floor mounts 106, 108 may also be located on a wall, a bulkhead, or other suitable surface within the vehicle. For example, one or more of floor mounts 106, 108 may be located on surface 116.

The embodiments discussed above reference at least two floor mounts, 106, 108 and at least two attachment mechanisms 110, 112. In other embodiments, wheelchair anchor system 100 may include one floor mount and one corresponding attachment mechanism. In other embodiments, wheelchair anchor system 100 may include a plurality of floor mounts, for example, at least three floor mounts, at least four floor mounts, or at least five floor mounts. Wheelchair anchor system 100 may include a plurality of attachment mechanisms, for example, at least three attachment mechanisms, at least four attachment mechanisms, or at least five attachment mechanisms. The number of floor mounts may correspond to the number of attachment mechanisms. In other examples, the number of floor mounts may differ from the number of attachment mechanisms. Any appropriate number of floor mounts and/or attachment mechanism may be utilized to properly secure wheelchair 114 to wheelchair anchor system 100. As shown in the figures, wheelchair 114 may include two back wheels 118 and two front wheels 140. In some examples, each of the wheels may include an attachment means 110, 112, and a corresponding floor mount 106, 108.

Attachment mechanisms 110, 112 may be straps, clamps, pins, brackets, latches, or combinations thereof. Attachment mechanisms 110, 112 may secure one or more wheels (e.g., back wheel 118 and/or front wheel 140) of wheelchair 114 by extending around or partially around a portion of wheel 118 and/or wheel 140 of wheelchair 114. In some embodiments, attachment mechanisms 110, 112 may then lock into place, e.g., to another portion of attachment mechanisms 110, 112 or to a portion of floor mounts 106, 108. Attachment mechanisms 110, 112 may be attached to one or more portions of wheelchair 114, e.g., a portion of the wheelchair frame and/or structural component of wheelchair 114, in addition to or in place of one or more wheels (e.g., wheel 118 or wheel 140). For example, a frame of wheelchair 114 may include mating receptacles (not shown) for receiving pins that fix attachment mechanisms 110, 112 to the frame of wheelchair 114. As another example, a frame of wheelchair 114 may be a shape (e.g., rounded, flat) so as to receive a clamp where a mating surface of the clamp fits securely against a mating surface of the frame. As another example, attachment mechanisms, e.g., straps, may be designed and/or configured to attach to a portion of a frame of wheelchair 114 to hold wheelchair 114 and/or occupant 138 in place. For example, such straps may be buckled and/or unbuckled to a portion of wheelchair 114. In other embodiments, the frame may further receive straps in locations where forces are transferred through structural portions of the frame (e.g., bars that support the seat) rather than non-structural portions of the frame (e.g., armrests).

As detailed above, wheelchair anchor system 100 may include harness 102. In some embodiments, harness 102 may include upper harness mount 122, harness strap 124, anchor point 126, and lower harness mount 136. Upper harness mount 122 may be affixed to surface 116, or any other appropriate surface of the vehicle. Upper harness mount 122 may be located any appropriate height above support surface 104, such that harness 124 may properly secure a passenger in wheelchair 114. Upper harness mount 122 may have a height measured from a top surface of support surface 104, the height ranging from about 20 inches to about 35 inches. For example, the height of harness mount 122 may range from about 20 inches to about 20 inches to about 34 inches, about 20 inches to about 33 inches, about 20 inches to about 32 inches, about 20 inches to about 31 inches, about 20 inches to about 30 inches, about 21 inches to about 35 inches, about 21 inches to about 34 inches, about 21 inches to about 33 inches, about 21 inches to about 32 inches, about 21 inches to about 31 inches, about 21 inches to about 30 inches, about 22 inches to about 35 inches, about 22 inches to about 34 inches, about 22 inches to about 33 inches, about 22 inches to about 32 inches, about 22 inches to about 31 inches, about 22 inches to about 30 inches, about 23 inches to about 35 inches, about 23 inches to about 34 inches, about 23 inches to about 33 inches, about 23 inches to about 33 inches, about 23 inches to about 32 inches, about 23 inches to about 31 inches, about 23 inches to about 30 inches, about 24 inches to about 35 inches, about 24 inches to about 34 inches, about 24 inches to about 33 inches, about 24 inches to about 32 inches, about 24 inches to about 31 inches, about 24 inches to about 30 inches, about 25 inches to about 35 inches, about 25 inches to about 34 inches, about 25 inches to about 33 inches, about 25 inches to about 32 inches, about 25 inches to about 31 inches, or about 25 inches to about 30 inches.

Upper harness mount 122 may be secured to surface 116 by any appropriate means including, e.g., screws, bolts, welds, fasteners, or combinations thereof. Upper harness mount may include a retractor mechanism (not shown) that allows harness strap 124 to vary in length by retracting any unused strap length. The retractor mechanism may include a spool around which a webbing of harness strap 124 wraps around when not extended, and a spring which may retract the spool. The retractor mechanism may also include a locking mechanism that restricts the movement of harness strap 124 in the event of a sudden deceleration of the vehicle, or a sudden jerking of harness strap 124. In some embodiments, lower harness mount 136 includes the retractor mechanism instead of or in addition to upper harness mount 122.

Harness strap 124 may be any appropriate material, e.g., fabric, nylon, polyester, plastic, or any combinations thereof. In some examples, harness strap 124 may be a webbing that is resistant to stretching. Harness strap 124 may be secured to upper harness mount 122 and/or lower harness mount 136.

Harness strap 124 may be secured to upper harness mount 122 and/or lower harness mount 136 via buckles, hooks, clamps, brackets, or via any other suitable mechanism. In some embodiments, one or more floor mounts 106, 108 may serve as the lower harness mount. As shown in FIGS. 1A-1B, harness strap 124 may extend from upper harness mount 122, across a shoulder and/or chest of occupant 138, around anchor point 126, and down to lower harness mount 136. Anchor point 126 may be a hook or protruding element that harness strap 124 may wrap around. In some examples, a portion of anchor point 126 may guide harness strap 124 such that harness strap 124 does not slide around and/or off of occupant 138 and/or wheelchair 114. Anchor point 126 may serve to guide harness strap 124 from upper harness mount 122 to lower harness mount 136, and to relieve excessive pressure on occupant 138, adding to comfort of occupant 138. In some embodiments, upper harness mount 122 and lower harness mount 136 may be on the same side (e.g., a left side or a right side) of wheelchair anchor system 100, and instead of extending across the chest of occupant 138, harness strap 124 may extend over a shoulder and/or arm of occupant 138. In other embodiments, wheelchair anchor system 100 may include a first harness (e.g., harness 102) and a second harness. In such examples, the first harness may extend from a first side of occupant 138 to a second side of occupant 138. The second harness may then extend from a first side of occupant 138, opposite from the first side that the first harness may extend from, to a second side of occupant 138, opposite from the second side that the first harness may extend from. For example, the first harness may extend from an upper side (e.g., left shoulder) of occupant 138 to a lower side that may be in an opposite direction of the upper side (e.g., right waist) of occupant 138. The second harness may extend from an upper side (e.g., right shoulder) of occupant 138 to a lower side that may be in an opposite direction of the upper side (e.g., left waist) of occupant 138 and wheelchair 114. In this configuration, the first harness and the second harness may cross over the chest of occupant 138 of wheelchair 114, creating an X-shape.

In certain embodiments not shown in FIGS. 1A and 1B, wheelchair anchor system 100 may include a harness system with four harness straps that may be secured to each other in a front waist area of occupant 138. Two shoulder straps may extend upward from the waist area over the shoulders of occupant 138, connecting to surface 116 at a single harness mount or at two individual harness mounts. The two shoulder straps may have an approximately parallel orientation with reference to each other as they extend upward across occupant 138. Two additional waist straps may extend around each side of the waist of occupant 138 and may connect to surface 116 or support surface 104 via one or more harness mounts. In some cases, the two shoulder straps and the two waist straps may be secured to a single buckle, while in other cases, the two shoulder straps are secured via webbing to the waist straps which are buckled together. Each of the shoulder straps and/or waist straps may be adjustable.

In some embodiments, wheelchair 114 may include built-in restraints that keep occupant 138 in wheelchair and it may not be necessary to use harness 102 to restrain occupant 138. In such embodiments, harness strap 124 may be placed behind occupant 138 and may only be used to restrain wheelchair 114. Harness strap 124 may be routed through any structures of wheelchair 114 to secure and anchor wheelchair 114 to surface 116 and/or lower harness mount 136. Harness 102 may also be affixed to support surface 104 and may wrap around a waist of occupant 138, (e.g., a lap safety belt).

Seating surface 120 of wheelchair 114 may include a flexible material to receive and support an occupant (e.g., occupant 138 of FIG. 1B). A height of wheelchair 114 may be sufficient to allow support surface 104 to be placed underneath seating surface 120. Wheelchair 114 may include a frame (e.g., structural weight/load-bearing elements) and wheels 118, 140 that may attach to floor mounts 106,108 and/or support surface 104. Wheelchair 114 may include brakes and/or locking mechanisms to lock wheelchair 114 in place.

FIG. 2 is a perspective view of a wheelchair anchor system 200, according to an embodiment of the present disclosure. Certain features of wheelchair 214 secured in a vehicle may be similar to those of exemplary wheelchair 114 discussed with respect to FIGS. 1A and 1B.

Wheelchair anchor system 200 may include at least one wheel mount 202 and at least one release 204. For example, wheelchair anchor system 200 may include at least two wheel mounts, at least three wheel mounts, or at least four wheel mounts. Wheelchair anchor system 200 may include at least two releases, at least three releases, or at least four releases. In some examples, the number of releases may correspond to the number of wheel mounts. In other examples, the number of releases may differ from the number of wheel mounts.

In some embodiments, wheel mount 202 may be attached to one or more anchor fixtures 206 of a vehicle. While not explicitly shown in FIG. 2, wheel mounts 202 may be affixed to wheelchair 214 via frame members, pins, or other connections such that wheel mounts 202 are integrated with wheelchair 214 whether wheelchair 214 is anchored to the vehicle or not. Wheel mounts 202 may include releases 204 to engage and/or disengage the connection between wheel mounts 202 and anchor fixtures 206. The connection between wheel mounts 202 and anchor fixtures 206 may include pins, clamps, cam locks, straps, or any other suitable connection.

Releases 204 may be a lever, a button, an actuator, or any other type of release mechanism configured to secure wheelchair 214 in a desirable position. Accordingly, wheelchair 214 may be anchored in place in the vehicle, including during vehicle movement. In some embodiments, the levers of releases 204 may be long enough to be reached by an occupant of wheelchair 214. For example, the occupant may engage and/or disengage wheel mounts 202 from anchor fixtures 206 using releases 204. To restrain wheelchair 214, the user may move one or more of releases 204 in a forward and/or backwards direction to secure wheelchair 214. To release wheelchair 214 from anchor fixtures 206, a user may manually move one or more of releases 204 in a forward and/or backwards direction to release wheelchair 214.

Wheel mounts 202 may be configured such that one wheel mount 202 engages two wheels 218, 240, as shown in FIG. 2. In other examples, wheel mount 202 may be configured to engage one of wheels 218, 240. Although two wheel mounts 202 are shown, one wheel mount 202 on one side of wheelchair 214 may be used. Wheel mounts 202 may include an element that extends toward a wheel (e.g., a front wheel 240 and/or a back wheel 218) of wheelchair 214 and engages (e.g., connects, attaches, etc.) with one or more spokes, a rim, or a hub of the wheel, and may prevent the wheel of wheelchair 214 from rotating.

In some embodiments, releases 204 may comprise a lock such as an indent, a pin, or other suitable lock mechanism to maintain release 204 in a closed position. For example, the lock in conjunction with release 204 may keep wheel mounts 202 from being released during movement of the vehicle. In some embodiments, releases 204 may restrain wheelchair 214 without being locked. In some embodiments, the lock may be biased towards engagement (e.g., a pin biased as extended via a spring). In some embodiments, the lock may be operable via a trigger on release 204 (e.g., a trigger configured to retract a biased spring to release the lock).

FIG. 3 shows a support surface 104 in a vehicle, according to an embodiment of the present disclosure. Support surface 104 may include hinge 304. Support surface 104 may rotate around hinge 304 from a first position 306 (e.g., substantially parallel to surface 116) to a second position 308 (e.g., extending in a lateral direction from surface 116). Support surface 104 may move in a direction 302 from a retracted position 306 to an extended position 308. In one or more embodiments, support surface 104 may be automatically moved between retracted position 306 and extended position 308. For example, support surface 104 may be automatically moved via a motor that drives hinge 304. In such example, surface 116 may include a button or an actuator to activate a motor to move support surface 104. In other examples, support surface 104 may be manually moved by a user between retracted position 306 and extended position 308. In retracted position 306, support surface 104 may be flush or parallel with surface 116 and/or parallel with connector segment 128 that is affixed to surface 116. In some embodiments, surface 116 may include a recess (not shown) shaped to accommodate support surface 104 when in retracted position 306. The recess in surface 116 may have dimensions corresponding to the dimensions of support surface 104, such that support surface 104 may properly be received in surface 116.

In extended position 308, support surface 104 may be held in place by one or more stops that may be included as a part of hinge 304. Additionally, or alternatively, the stops may be part of flange 132 and/or surface 116. Using multiple different stops may allow support surface 104 to be placed at multiple different angles relative to surface 116 to accommodate different types of wheelchairs. Additionally, wheelchair anchor system 100 may be used with or without support surface 104 in extended position 308. In embodiments where harness 102 may be attached to support surface 104, harness 102 may be used whether support surface 104 is in retracted position 306 or extended position 308. In some embodiments, support surface 104 may be placed in retracted position 306 to accommodate a non-wheelchair seat, such as non-wheelchair seat 502 described with reference to FIG. 5 below.

FIG. 4 shows an exemplary support surface 104 according to an embodiment of the present disclosure. Certain features of support surface 104 may be similar to those of exemplary support surface 104 discussed with respect to FIGS. 1A-3 and may include any features of support surface 104 as described above and as depicted in FIGS. 1A, 1B, and 3. In other examples, support surface 104 may include one or more slots 402 via which may allow support surface 104 to travel in a vertical (up and down) direction 410. Support surface 104 may be secured at different heights to accommodate wheelchairs of varying heights. For example, support surface 104 may be detachably secured at a selected height via one or more pins 408 or similar suitable attachments. In other examples, pins 408 may be screws, bolts, or any other suitable component to secure support surface 104 to surface 116. Surface 116 may include holes (not shown) sized and shaped to receive pins 408. Slots 402 may include a plurality of holes sized and shaped to receive pins 408. In such embodiments, pins 408 may be inserted through the holes of slots 402 and inserted into the holes of surface 116. In some embodiments, support surface 104 may be secured at predetermined heights. For example, support surface 104 may include notches to fix support surface 104 at predetermined heights. In some embodiments, support surface 104 may be attached to a frame of a wheelchair.

In some embodiments, a filler (e.g., a pad or a cushion) may be placed on top of support surface 104 to fill any gaps between support surface 104 and a seating surface 120 of wheelchair 114, such that the support surface 104 is in contact with a the seating surface 120. Accordingly, any downward load (e.g., while a vehicle experiences a bump, turbulence, or a crash condition) may be transferred to the supporting structure. Reducing a gap between support surface 104 and seating surface 120 of wheelchair 114 may reduce the force of an impact on a spine of occupant 138.

In some embodiments, a portion of support surface 104 may attach to a portion of wheelchair 114. For example, a portion of support surface 104 may attach to a seat portion, one or more armrest portions, one or more of the wheels, or a portion of a frame of the wheel chair. Support surface 104 may attach to wheelchair 114 via any appropriate attachment mechanism, e.g., a pin, a lock, a pin and lock system, a clamp, a strap, or combinations thereof. In some embodiments, support surface 104 may include at least one rail or track configured for receiving a portion of wheelchair 114. For example, a portion of wheelchair 114 may latch onto a rail or track of support surface 104 and lock into place.

FIG. 5 is a perspective view of a non-wheelchair seat 502 in a vehicle. Non-wheelchair seat 502 may be proximate to surface 516. Surface 516 may be similar to surface 116 discussed above with reference to FIG. 1. As partially shown in FIG. 5, non-wheelchair seat 502 may be mounted to a vehicle via floor mounts 504. Floor mounts 504 may be disconnected from non-wheelchair seat 502 via pins, locks, clamps, or other suitable connection systems. Non-wheelchair seat 502 may be removable from the vehicle. In some embodiments, floor mounts 504 may be attached to a floor using a track along the floor of a vehicle, for example, to allow for adjustable placement of non-wheelchair seat 502.

Floor mounts 504 may be examples of floor mounts 106 and 108 of FIG. 1, and may serve to anchor non-wheelchair seat 502 to the vehicle as well as a wheelchair, such as wheelchair 114. In some embodiments, a method of installing a wheelchair, such as wheelchair 114, may include uninstalling non-wheelchair seat 502 from one or more floor mounts 504. Wheelchair 114 may then be installed using floor mounts 504 to secure wheelchair 114 to the floor.

As shown in FIG. 5, non-wheelchair seat 502 may include a seatback 506 and seat 508. In some embodiments, portions of non-wheelchair seat 502 may be stowed to create space for wheelchair 114. For example, seat 508 may fold upwards, e.g., in a direction towards seatback 506. Once seat 508 is folded up against seatback 506, a substantially vertical surface is produced. Such surface, including, a portion of surface 516 (e.g., a surface of the vehicle) and a bottom surface 508*a* of seat 508, may function similarly to a surface 116 as described above in reference to FIGS. 1A-1B. In such embodiments, wheelchair 114 may be secured via wheelchair anchor system 100. Such configuration may utilize any combination of the components of wheelchair anchor system 100 as described above. When the area of the vehicle is not being use for a wheelchair, seat 508 may be folded back towards the floor of the vehicle, i.e., away from seatback 506. A non-wheelchair passenger may then utilize non-wheelchair seat 502. Such configuration of non-wheelchair seat 502 may be useful in vehicles, e.g., airplanes, where wheelchair passengers are not able to utilize their own personal wheelchair. To travel on an aircraft, wheelchair passengers typically have to get out of their personal wheelchair and utilize a non-wheelchair seat. Their personal wheelchair is then stowed in the aircraft, e.g., in the cargo hold. It may be physically difficult for a passenger to get out of their personal wheelchair, onto an aircraft, and then into a non-wheelchair seat. Further, stowing a wheelchair in the cargo hold may cause unnecessary damage to the wheelchair. Utilizing a non-wheelchair seat 502 along with wheelchair anchor system 100 in a vehicle, e.g., an aircraft, may allow wheelchair passengers to sit in their own wheelchair while traveling. This may greatly benefit the physical, mental, and/or emotional wellbeing of wheelchair passengers.

Non-wheelchair seats according to the present disclosure, e.g., in FIG. 5, may be of any size conforming to vehicle standards and safety standards. The non-wheelchair seats, including the legs and/or feet, may have a width ranging from about 14 inches to about 20 inches. For example, a width of the seat may range from about 14 inches to about 18 inches, about 14 inches to about 16 inches, about 16 inches to about 20 inches, or about 16 inches to about 18 inches. In some examples, a width of the seat may be about 14 inches, about 15 inches, about 16 inches, about 17 inches, about 18 inches, about 19 inches, or about 20 inches. A portion of the seat, e.g., a bullnose of the seat may have a distance, i.e., a height, relative to a distal surface, e.g., a floor of a vehicle, ranging from about 10 inches to about 18 inches from the floor. For example, the distance may range from about 10 inches to about 16 inches, about 12 inches to about 18 inches, or about 12 inches to about 16 inches. In some examples, the distance of the seat from a distal surface may be about 10 inches, about 11 inches, about 12 inches, about 13 inches, about 14 inches, about 15 inches, or about 16 inches.

Components of the wheelchair anchor systems in this disclosure may be formed of any suitable material with sufficient weight and components to withstand energy and impact from the vehicle and/or with any characteristics suitable for use in a vehicle. The wheelchair anchor systems and any of its components, e.g., floor mounts, attachment mechanisms, a support surface, harness straps and mounts, etc., may include plastic materials, metals, metallic materials (e.g., aluminum alloys), polymers, composite materials, or combinations thereof. In some embodiments, components of the seat may be made of metal machined to a desired configuration. For example, a support surface (e.g., support surface 104) may include composite materials while a hinge joint (e.g., hinge 304) may include aluminum.

The foregoing descriptions of specific embodiments of the present disclosure are presented for purposes of illustration and description. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. For example, it will be apparent to those skilled in the art that various modifications and variations can be made to the disclosed vehicles and/or wheelchairs. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A wheelchair anchor system for a vehicle, the wheelchair anchor system comprising:
- a support surface configured to support a portion of a wheelchair;
- a floor mount configured to secure a portion of the wheelchair to a surface of the vehicle;
- an attachment mechanism for securing a portion of the wheelchair to the floor mount; and
- a harness configured to secure an occupant of the wheelchair;
- wherein a height of the support surface is adjustable.

2. The wheelchair anchor system of claim 1, wherein the support surface extends laterally from a surface of the vehicle.

3. The wheelchair anchor system of claim 2, wherein, in a first position, the support surface extends laterally from the surface of the vehicle, and in a second position, the support surface is received in a recess of the surface of the vehicle.

4. The wheelchair anchor system of claim 1, comprising a plurality of floor mounts and a plurality of attachment mechanisms.

5. The wheelchair anchor system of claim 1, wherein the harness extends from a surface of the vehicle to the floor mount.

6. The wheelchair anchor system of claim 5, further comprising an upper harness mount attached to the surface of the vehicle and a lower harness mount attached to the floor mount.

7. The wheelchair anchor system of claim 1, wherein the support surface is configured to slide underneath a seat portion of the wheelchair.

8. The wheelchair anchor system of claim 1, wherein the support surface is a non-wheelchair seat.

9. The wheelchair anchor system of claim 1, further comprising a suspension device for attaching a portion of the wheelchair to a surface of the vehicle, wherein the suspension device is configured to absorb forces during vehicle motion.

10. The wheelchair anchor system of claim 1, wherein the vehicle is an aircraft.

11. A wheelchair anchor system for a vehicle, the wheelchair anchor system comprising:
- a non-wheelchair seat, wherein a portion of the non-wheelchair seat is configured to fold into a recess of a first vehicle surface;
- a floor mount configured to secure a wheelchair to a second vehicle surface; and
- a harness configured to secure an occupant of the wheelchair.

12. The wheelchair anchor system of claim 11, wherein the first vehicle surface is a vertical wall of the vehicle.

13. The wheelchair anchor system of claim 11, wherein the second vehicle surface is a floor surface.

14. The wheelchair anchor system of claim 11, wherein the harness is coupled at a first end to the first vehicle surface and at a second end to the second vehicle surface.

15. The wheelchair anchor system of claim 11, further comprising at least two floor mounts.

16. A method of securing a wheelchair to a vehicle, the method comprising:
- stowing a non-wheelchair seat in a vehicle, wherein the stowing produces a substantially vertical surface;
- placing a wheelchair in the vehicle, such that the wheelchair abuts a portion of the non-wheelchair seat, wherein the portion of the non-wheelchair seat corresponds to a bottom seat surface of the non-wheelchair seat; and
- anchoring the wheelchair to a floor of the vehicle.

17. The method of claim 16, wherein stowing the non-wheelchair seat comprises folding the non-wheelchair seat towards a vertical surface of the vehicle.

18. The method of claim 16, wherein anchoring the wheelchair to the floor comprises anchoring at least one wheel of the wheelchair to a floor mount of the vehicle.

19. The method of claim 16, further comprising securing a passenger in the wheelchair with a harness.

* * * * *